United States Patent Office 2,723,679
Patented Nov. 15, 1955

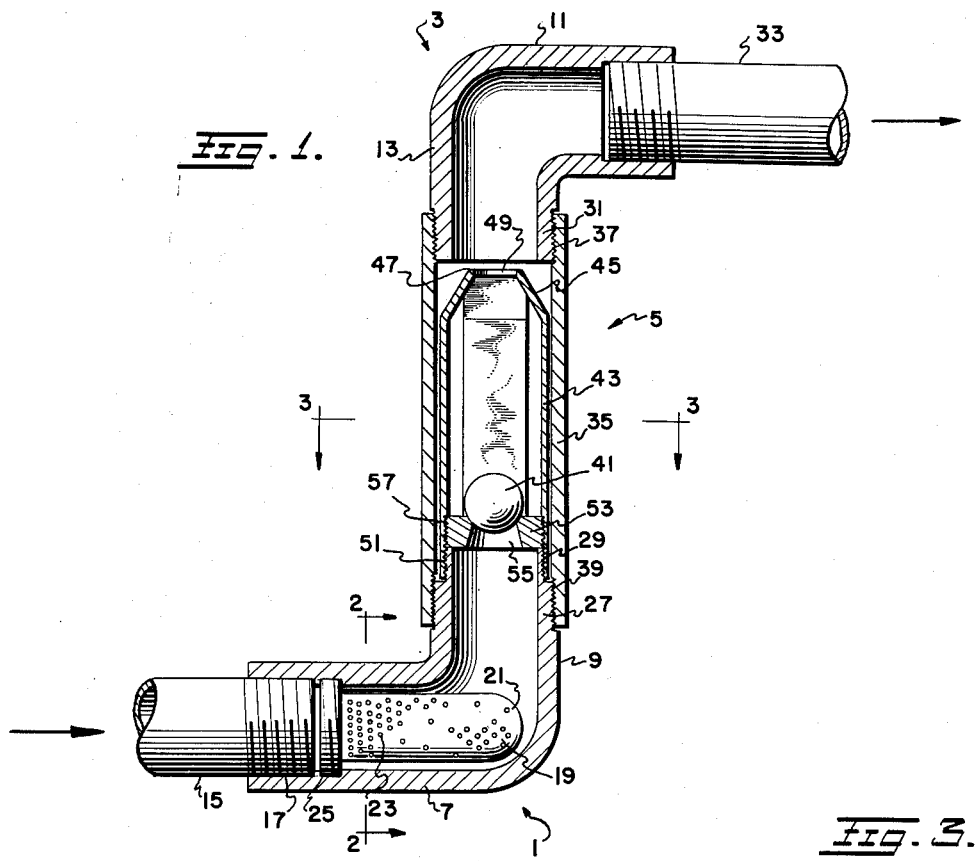
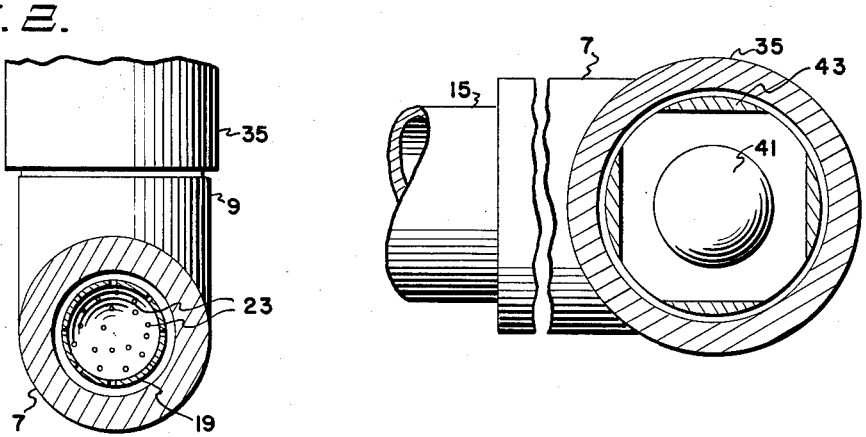

2,723,679

SELF-CLEANING VERTICAL AIR CHECK VALVE

Howard B. Harris and Alton B. Henley, Graham, Tex.

Application November 5, 1954, Serial No. 467,116

3 Claims. (Cl. 137—533.13)

This invention relates broadly to check valves for compressed air lines to regulate and control air pressure tanks and in its more specific aspects it relates to a check valve which is preferably vertically positioned in the air line and is so designed and arranged that it will give instant opening and quick cut-off and is of a unique design providing a positive self cleaning action; and the nature and objects of the invention will be readily recognized and understood by those skilled in the arts to which it relates in the light of the following explanation and detailed description of the accompanying drawings illustrating what we at present believe to be the preferred embodiment or mechanical expression of our invention from among various other forms, arrangements, combinations and constructions, of which the invention is capable within the spirit and scope thereof.

This valve has been particularly designed for use in air controlled operations where a positive and quick acting check valve is required in the air line between the compressed air tank and the mechanism operated by the air. While we have disclosed this air check valve as a vertical type it is equally satisfactory in its operation when it replaces a horizontal type valve or a horizontal swing type valve.

The conventional horizontal and horizontal swing type valves provide a guide in which a valve stem or the valve travels and provides for a short travel of the valve. Our experience with these types of valves shows that the mechanisms will corrode, gall and stick and in many installations will quickly beat out the ball and seats, the guides and the entire mechanism will require replacement. An inherent fault of the prior valves of which we are aware lies in the design wherein no provision is made for parts replacement and an entire new unit must be used when only a part of a valve may have failed, obviously such construction is uneconomic in labor as well as in material.

We have overcome this fault by providing a valve which is of simple and inexpensive construction and affords a design permitting quick and easy parts replacement so that a complete new valve is not required when one part becomes worn or otherwise damaged.

The research which we have made in this field indicates that even with a screening or filtering medium operatively positioned in the air line ahead of the valve some foreign matter will reach the valve, so that the valve, valve guide and valve seat and parts thereof will become worn and inoperative.

The valve embodied in this invention comprises a check valve in the form of a ball which is operative within a novel cage which includes a seat. The valve mechanism itself is mounted and arranged in vertical position, that is the valve mounting portion of the assembly is mounted in a vertical section between two horizontal sections of the entire compressed air line assembly.

We have devised a guide or cage in which the valve is operable which is formed integral with the valve bumper which provides for ease of assembly and replacement and for economy in the production of the unit. The valve seat has been designed for effecting an easy and rigid association with the compressed air line. This has been done in a manner which expedites the removal in a quick and easy way of the seat from the assembly and also affords an easy replacement of a valve seat.

As we have briefly mentioned above one of the serious objections of prior valves resides in the rapid deterioration of the valve and parts thereof caused by foreign matter. This difficulty has been overcome in our valve by a construction wherein we cause a spinning action in the ball in its opening and closing movements and this spinning action causes the ball to be self cleaning to thereby eliminate substantially all corrosion which does form on valves.

The air line of this invention is of angular construction forming a vertical section between two horizontal sections. The valve mechanism is operatively mounted in the vertical section. Hence when the pressured air is flowing through the system it passes from a horizontal into the vertical section and this angular flow creates a turbulence of air in the vertical section which lifts the valve and generates a spinning reaction therein. This spinning action is aided by the construction of the bumper at the top of the ball cage or guide which the ball valve engages at the top of its opening stroke.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in elevation of the self cleaning vertical air check valve assembly with parts thereof in section.

Fig. 2 is a view taken on line 2—2 of Fig. 1.

Fig. 3 is a view taken on line 3—3 of Fig. 1.

Referring to the accompanying drawings and particularly Fig. 1 thereof wherein we have illustrated the complete assembly which includes the vertical air check valve section, and we have used the reference character 1 to designate in its entirety the inlet or lower elbow of the assembly and we have used the reference character 3 to designate in its entirety the upper or outlet elbow of the assembly. We provide a vertical air check valve assembly which extends between and connects the inlet and outlet elbows 1 and 3, respectively, and we have designated this vertical air check valve assembly in its entirety by the numeral 5. The inlet elbow 1 includes a horizontally extending portion 7 and a vertically extending portion 9 while the outlet elbow 3 includes a horizontally extending portion 11 and a vertically extending portion 13.

The assembly which we have devised is adapted to be inserted in and form a part of the air line or conduit which extends from a compressed air tank to any mechanism which is to be operated by the compressed air. As will be evident from Fig. 1 of the drawings this assembly is so arranged and constructed that it provides a vertical section in the air flow line or conduit and it is in this vertical section that the self cleaning and quick acting air check valve is located. We provide a horizontally extending compressed air flow conduit 15 which extends from a compressed air tank (not shown) and is connected to and extends into the horizontal portion 7 of the inlet elbow 1 by threading as illustrated at 17. One of the problems which has been encountered in valves of the general character in which we are interested and which are adapted for use in compressed air lines has been that foreign matter which is carried by the air as it flows through the conduits and the valve causes deterioration and other damaging effects on the valve. And in order to reduce the amount of foreign matter flowing with the air through the assembly we have provided an air cleaning device which provides an initial cleaning or straining of the air as it enters the assembly. This strainer or air cleaner may comprise an elongated tubular element 19 having a closed inner end 21, the body of the element 19 and the closed inner end 21 thereof being provided with a multiplicity of perforations 23. The outer or inlet end of the element 19 is open and adjacent such outer end we provide a radially outwardly extending externally threaded imperforate collar 25 so that the entire strainer assembly may be threadedly positioned within the inlet elbow 1 by threading the collar thereinto. Consideration of Fig. 1 of the drawings clearly shows that the strainer element is removably mounted closely adjacent the mouth of the conduit 15 so that compressed air flowing through the conduit 15 exhausts therefrom directly into the strainer element 19 and flows out of the strainer element through the multiplicity of perforations 23 into the inlet elbow 1 and upwardly through the vertically extending portion 9 thereof. While we have illustrated as an example a tubular type of strainer it will be recognized that we could employ a plate or disc like strainer which would be removably fixed in the inlet elbow 1 and that such arrangement would still fall within the spirit and scope of our invention.

The end of the vertically extending portion 9 of the inlet elbow 1 is formed in a stepped arrangement to provide a lower externally threaded section 27 and a further externally threaded section 29 at the outlet end of the inlet elbow 1, which constitute a two point stepped male connection. The threaded section 29 is positioned or located in a plane radially inwardly with respect to the externally threaded section 27. The threaded sections 27 and 29 are adapted to removably mount the valve assembly and the housing therefor as will become apparent as this description proceeds.

The outlet or upper elbow 3 is provided with an externally threaded section 31 on its inlet end on the vertically extending portion 13 thereof and at its outlet end 11 is adapted to removably receive by threading or the like a conduit 33 which connects the assembly with the tool or mechanism which is to be operated by the compressed air.

The valve assembly 5 includes a cylindrical housing 35 which is of slightly greater internal diameter than the internal diameter of the elbows 1 and 3, and the valve housing 35 is provided with internal threads 37 and 39 at each end thereof. The vertical air check valve assembly includes a vertically extending cage or guide for a ball valve 41, such cage preferably including four vertically extending circumferentially spaced guide posts 43 each of which is inwardly bent adjacent its upper end to provide inwardly and upwardly extending members 45. The uppermost transverse edges of the extensions 45 are spaced apart providing an opening 49 which is of less diameter than the diameter of ball valve 41, the side edges of adjacent extensions may meet and be connected as at 47. Each of the vertical guide elements or posts 43 are internally threaded for a substantial distance inwardly from their lower ends, as at 51. We provide an annular valve seat element 53 having a central opening 55 for the flow of the air therethrough when the ball valve is in unseated position. The valve seat element 53 is externally threaded as at 57 and is of an external diameter substantially equal to the internal diameter of the area defined by the guide posts of the cage.

The vertical portion of our air check valve assembly is assembled in the following manner. The annular valve seat element 53 with the ball valve 41 seated thereon is threaded into the cage by threading the same on to the threads which are provided on the internal lower ends of each guide post 43, the valve seat being threaded as far into the cage as is possible. The valve cage with the seat operatively connected therewith, so that the internally threaded ends of each guide post 43 extend below the lower surface of the valve seat 53, are then operatively mounted on the outlet end or vertical section 9 of the inlet elbow 1 by threading such projecting ends of the guide posts onto the uppermost threaded section 29 of the two point stepped male connection which is provided on the upper end of the inlet elbow 1. When this has been accomplished the housing 35 is threaded on the externally threaded end 27 of the two point stepped male connection on the inlet elbow 1 and the outlet elbow 3 is then threaded on to the threaded upper end 37 of the housing 5. It will be evident that the outlet elbow 3 is connected to the assembly before the conduit 33 has been fixed into the mouth of this elbow. It will also be evident that the strainer element must be mounted in the inlet elbow 1 by threading the collar 25 therein and then the conduit 15 may be fixed in the elbow.

In the operation of our valve when pressured air is flowing therethrough the ball valve 41 spins as it moves upwardly in the cage and engages the upper bumper which is formed by the extensions 45 and it also spins as it returns to seated position on the annular seat 53. This spinning reaction of the valve under the action of the flowing air is caused in part by the turbulence which is created in the air as it is forced to change its direction of flow from horizontal to vertical in the inlet elbow 1 and when it engages and unseats the ball valve 41 such valve will be caused to spin due to the turbulence of the air. The self cleaning operation is also caused by the particular construction of the cage which consists of the guide posts 43. It will be apparent from the drawings that the internal area defined by the guide posts of the cage is of greater diameter than the diameter of the ball so that the ball in its reciprocating movements within the cage under the action of the turbulent air will not reciprocate in a straight line but instead will be caused in its upward and downward movements to move laterally from side to side of the cage and in such movements while the ball is spinning the corrosion which would otherwise form on the posts and on the valve itself will be cleaned off.

Due to our unique mounting arrangement of the valve elements it will be appreciated that the valve seat 53 which is separable from the cage may be replaced without having to replace the entire cage, or of course the cage may be replaced without requiring a new valve seat. Due to the particular type of connection which we use in mounting the various elements together it will be understood that the assembly and disassembly of the apparatus is materially facilitated.

We claim:

1. A conduit assembly for flow therethrough of pressured fluid, including inlet and outlet members spaced apart in the assembly and a valve organization in the conduit assembly between the inlet and outlet members and in communication therewith, said inlet member having stepped externally threaded portions at its outlet end and said outlet member being externally threaded at its inlet end, said valve organization including an exterior housing threadedly connected at one end with one of the threaded portions of said inlet member and threadedly connected at its other end to the outlet member and in communication with both of said members, a valve cage comprising circumferentially spaced axially extending members connected together at one end and provided with an internally threaded portion on their other ends, an externally threaded valve seat threadedly connected to said internally threaded portions on said axially extending members in position thereon leaving a section of said internally threaded portion on each axially extending member projecting beyond said valve seat, said projecting parts of said axially extending members being threadedly connected to the other of said stepped externally threaded portions of said inlet member so that the cage extends axially within the housing, and a ball valve within said cage and operable therein under the action of the pressured fluid to and from closing position on said valve seat.

2. A conduit assembly in accordance with claim 1 wherein said circumferentially spaced axially extending members are inwardly bent at their connected ends providing a bumper for the ball.

3. A conduit assembly for flow therethrough of pressured fluid, including an inlet elbow having a horizontal portion, said inlet elbow having a vertical portion provided adjacent its outlet end with stepped externally threaded portions, an outlet elbow having a horizontal portion, said outlet elbow having a vertical portion provided adjacent its inlet end with an externally threaded portion, said inlet and outlet elbows being spaced apart and said assembly including a valve organization vertically disposed between and connected to and in communication with said inlet and outlet elbows, said valve organization comprising an exterior housing threadedly connected at one end with one of the stepped externally threaded portions of the inlet member and threadedly connected at its other end to the externally threaded portion of said outlet elbow and in communication with both of said elbows, a valve cage comprising circumferentially spaced axially extending members connected together at one end and provided with an internally threaded portion on each of their other ends, an externally threaded valve seat threadedly connected to said internally threaded portions on said axially extending members in position thereon leaving a section of said internally threaded portion on each axially extending member projecting beyond said valve seat, said projecting parts of said axially extending members being threadedly connected to the other of said stepped externally threaded portions of said inlet member so that the cage extends axially within the housing, and a ball valve within said cage and operable therein under the action of the pressured fluid to and from closing position on said valve seat.

References Cited in the file of this patent

UNITED STATES PATENTS

| | | |
|---|---|---|
| 691,395 | Logue | Jan. 21, 1902 |
| 956,050 | Dickinson | Apr. 26, 1910 |
| 1,120,118 | Ashlock | Dec. 8, 1914 |
| 1,145,845 | Lietz | Aug. 10, 1915 |
| 1,672,127 | Holley | June 5, 1928 |
| 2,591,951 | Lowry | Apr. 8, 1952 |

FOREIGN PATENTS

| | | |
|---|---|---|
| 849,370 | France | Aug. 11, 1939 |